US008359596B2

(12) United States Patent
Kobayashi et al.

(10) Patent No.: US 8,359,596 B2
(45) Date of Patent: Jan. 22, 2013

(54) DETERMINING CAPABILITY OF AN INFORMATION PROCESSING UNIT TO EXECUTE THE JOB REQUEST BASED ON SATISFYING AN INDEX VALUE AND A CONTENT OF PROCESSING OF THE JOB

(75) Inventors: Seiji Kobayashi, Yokohama (JP); Takashi Ohta, Tokyo-to (JP); Kazuo Iwano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 11/569,014

(22) PCT Filed: May 11, 2005

(86) PCT No.: PCT/JP2005/008628
§ 371 (c)(1),
(2), (4) Date: May 1, 2007

(87) PCT Pub. No.: WO2005/111798
PCT Pub. Date: Nov. 24, 2005

(65) Prior Publication Data
US 2007/0250835 A1    Oct. 25, 2007

(30) Foreign Application Priority Data

May 14, 2004    (JP) .................................. 2004-145390

(51) Int. Cl.
*G06F 9/46*    (2006.01)
*G06F 15/173*    (2006.01)
(52) U.S. Cl. .................... 718/102; 718/104; 709/226
(58) Field of Classification Search ........... 718/102–105
See application file for complete search history.

(56) References Cited

U.S. PATENT DOCUMENTS 4,839,798 A  *  6/1989  Eguchi et al. ................ 718/105
(Continued)

FOREIGN PATENT DOCUMENTS

JP        61-114363 A        6/1986
JP        10207849 A         8/1998
(Continued)

OTHER PUBLICATIONS

Weidmann, Matthias, European Patent Office, Office Action Dated Feb. 16, 2009, Application No. 05 739 336.5-1243.

(Continued)

*Primary Examiner* — Thomas Lee
*Assistant Examiner* — Caroline H Arcos
(74) *Attorney, Agent, or Firm* — Andrea Bauer; Hoffman Warnick LLC

(57) ABSTRACT

A grid computing system having a plurality of information processing apparatuses, each of which comprises an index value storing part for storing an index value indicative of the throughput of the information processing apparatus itself; a request acquiring part for acquiring a job execution request that requests an execution of a job; a job executing part for executing the job, based on the index value stored in the index value storing part and also based on the process contents of the job, if determining that the job is to be executed in the foregoing information processing apparatus; and a request transmitting part for forwarding the job execution request to another information processing apparatus connected to the foregoing information processing apparatus if determining that the job is not to be executed in the foregoing information processing apparatus.

11 Claims, 11 Drawing Sheets

U.S. PATENT DOCUMENTS

| | | | | | |
|---|---|---|---|---|---|
| 5,031,089 | A | * | 7/1991 | Liu et al. | 709/226 |
| 5,898,870 | A | * | 4/1999 | Okuda et al. | 718/104 |
| 5,923,875 | A | * | 7/1999 | Tabuchi | 718/105 |
| 6,128,279 | A | * | 10/2000 | O'Neil et al. | 370/229 |
| 7,016,853 | B1 | * | 3/2006 | Pereless et al. | 705/1.1 |
| 7,203,943 | B2 | * | 4/2007 | Shaffer | 718/104 |
| 2003/0101265 | A1 | | 5/2003 | Dantzig et al. | |
| 2003/0233442 | A1 | * | 12/2003 | Futatsugi | 709/223 |
| 2004/0003077 | A1 | | 1/2004 | Bantz et al. | |
| 2004/0015973 | A1 | * | 1/2004 | Skovira | 718/103 |
| 2005/0198634 | A1 | * | 9/2005 | Nielsen et al. | 718/100 |

FOREIGN PATENT DOCUMENTS

| | | |
|---|---|---|
| JP | 10-334058 A | 12/1998 |
| JP | 11316692 A | 11/1999 |
| JP | 2002251292 A | 9/2002 |
| JP | 2004021287 A | 1/2004 |

OTHER PUBLICATIONS

KIPO Office Action Date May 27, 2009, "Information Materials for IDS".

LNCS Grid Computing, 2242, 2001, Springer Berlin/Heidelberg, Adriana Iamnitchi et al., "On Fully Decentralized Resource Discovery in Grid Environments", pp. 51-62.

Proceeding of ACMSE '04, Apr. 2-3, 2004, ACM, Enis Afgan, "Role of the Resource Broker in the Grid", pp. 299-300.

JPO, Office Action dated May 26, 2009, "Information Materials for IDS", pp. 1-2.

EPO, Examination Report, Application No. 05 739 336.5-2221, Dated Feb. 10, 2011.

* cited by examiner

FIG.3

| INDEX | CHARACTERISTICS INDEX | | | | LOADING INDEX | | |
|---|---|---|---|---|---|---|---|
| ID | CPU FREQUENCY | MEMORY CAPACITY | OS | ...... | RATE OF USE OF CPU | RATE OF USE OF MEMORY | ...... |
| A | 1.6GHz | 64MB | X | | 90% | 80% | |
| B | 1.2GHz | 64MB | X | | 20% | 25% | |
| C | 800MHz | 512MB | Y | | 35% | 50% | |
| D | 1.8GHz | 64MB | X | | 60% | 55% | |
| E | 1.2GHz | 64MB | Y | | 55% | 40% | |
| F | 500MHz | 256MB | X | | 70% | 30% | |
| G | 2.0GHz | 96MB | Z | | 80% | 50% | |
| H | 750MHz | 256MB | X | | 45% | 55% | |
| I | 2.8GHz | 1GB | X | | 50% | 60% | |
| ...... | | | | | | | |

210

| CHARACTERISTICS INDEX | ID |
|---|---|
| CPU FREQUENCY | A, B, D, E, G, I |
| MEMORY CAPACITY | C, F, H, I |
| OS | A, B, D, F, H, I |
| ⋮ | ⋮ |

FIG.10
(a)
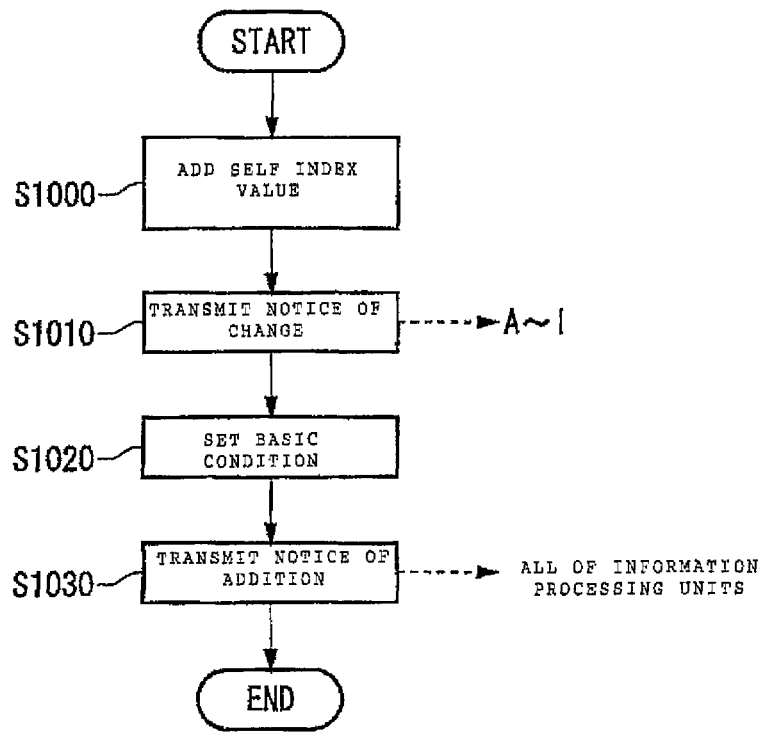
(b)
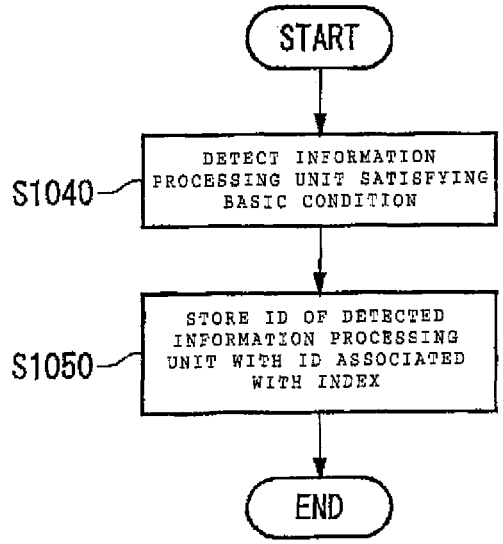

US 8,359,596 B2

DETERMINING CAPABILITY OF AN INFORMATION PROCESSING UNIT TO EXECUTE THE JOB REQUEST BASED ON SATISFYING AN INDEX VALUE AND A CONTENT OF PROCESSING OF THE JOB

TECHNICAL FIELD

The present invention relates to a grid computing system, an information processing unit, a job execution request generation unit, a control method, program, and a recording medium, and, in particular, relates to the grid computing system, the information processing unit, the job execution request generation unit, the control method, the program, and the recording medium, which cause an information processing unit pertinent to the contents of process for a job to be processed.

BACKGROUND ART

In recent years, a grid computing system, in which a plurality of information processing units are connected with each other via a network, and the information processing units collaborate and execute a job required to be executed, has been drawn attention. Heretofore, in the grid computing system, a predetermined job management server manages the states of all of the information processing units within the system. A scheduler provided in the job management server causes an information processing unit to execute a job, the information processing unit satisfying a predetermined condition, for example having an excess in a processing capability.

As a related technology, a technology searching for a communication path over a network has been proposed (refer below to the Patent Literatures 1 and 2).

[Patent Literature 1] Japanese Patent Application Laid-open No. Hei 7-66834
[Patent Literature 2] Japanese Patent Application Laid-open No. 2001-175560

DISCLOSURE OF THE INVENTION

Problems to be Solved by the Invention

However, when a large number of information processing units are involved in the system, the job management server may not be able to appropriately control all of the information processing units within the system. For example, with the recent spread of network technology, a plurality of information processing units, which are respectively managed by different organizations, are becoming connected with each other. In this case, it is not easy to manage when, for example, each organization newly adds an information processing unit or disconnects an information processing thereof unit from a network.

Further, when each organization operates its job management server independently, various inconveniences occur. For example, when an information processing unit has an excess in a processing capability, a plurality of job management servers may cause the information processing unit to execute respective jobs. Therefore, conflict in use of the calculation resources of the information processing unit occurs, resulting in that the execution of each job possibly becomes very inefficient. In addition, when the number of information processing units managed by a job management server becomes huge, a load on the job management server becomes very heavy, thus possibly causing it to be incapable of performing processes.

Apart from the above described approach, providing an integrated management server, which further controls a plurality of job management servers, may be considered as a solution to the above problems. However, when a plurality of job management servers are provided apart from each other or when a plurality of job management servers control respective information processing units by means of very different approaches, it is difficult to provide the integrated management server.

The Patent Literatures 1 and 2 are intended to select a path between an information processing unit and another information processing unit. Because of this, it is a precondition that the information processing units of the source of the communication and of the destination of the communication are designated in advance. Accordingly, it is difficult to apply the technologies described in the Patent Literatures 1 and 2 to a scheduling process for determining which information processing unit should execute the job.

An object of the present invention is to provide the grid computing system, the information processing unit, the job execution request generation unit, the control method, the program, and the recording medium, which are capable of solving the above described problems. This object is achieved by combining features described in the independent claims in the claims. Further, the dependent claims are used to define advantageous embodiments of the present invention.

To solve the above described problems, in the first embodiment of the present invention, there is provided a grid computing system including a plurality of information processing units, each of the plurality of information processing units including: a self-index value storage section for storing an index value indicating a processing capability of the information processing unit; a request acquisition section for acquiring a job execution request asking for execution of a job; a job execution section for executing the job when it is determined, on the basis of the index value stored in the self-index value storage section and a content of processing of the job, that the information processing unit will execute the job; and a request transmission section for transferring the job execution request to the other information processing units connected to the information processing unit when it is determined that the information processing unit will not execute the job. There are further provided an information processing unit which the grid computing system has, a control method for controlling the information processing unit, a program for controlling the information processing unit, and a recording medium having the program recorded therein.

Incidentally, the above described abstract of the present invention does not enumerate all of the features necessary for the present invention, and a sub-combination of these features also may form an invention.

Effect of the Invention

According to the present invention, a grid computing system can be efficiently managed.

PREFERRED EMBODIMENT OF THE INVENTION

The present invention will be described hereinafter by means of embodiments of the invention. The embodiments to be described hereinbelow, however, do not limit the invention according to the claims, and not all of features in the embodiments are essential to the solving means of the present invention.

FIG. 1 is a schematic diagram showing a grid computing system 10. The grid computing system 10 includes a plurality of information processing units. In addition, the grid computing system 10 sequentially transfers job execution requests requesting executions of jobs to the plurality of information processing units. Moreover, the grid computing system 10 causes each of the plurality of information processing units to determine whether the job should be executed in the information processing unit. In this manner, an object of the grid computing system 10 is that each of the information processing units effects scheduling of jobs by itself, without having a specific job management server.

The grid computing system 10 includes a network 1, a network 2, and a network 3. The networks 1 to 3 may be managed by, for example, organizations being different from each other. The network 1 has an information processing unit 20, an information processing unit E, an information processing unit F, an information processing unit G, and an information processing unit H. The network 2 has an information processing unit B, an information processing unit C, and an information processing unit D. The network 3 has an information processing unit A, an information processing unit I, and a job execution request generation unit 30.

The job execution request generation unit 30 generates a job execution request when an instruction of an execution of a job is inputted by a user, and transmits a job execution request to the information processing units A and C. The information processing unit A determines, on the basis of the job execution request, whether the job is executed in the information processing unit A. When determining not to execute the job, the information processing unit A transfers the job execution request to the information processing unit 20. Further, the grid computing system 10 may include a plurality of the job execution request generation units 30. Furthermore, the job execution request generation unit 30 may have the function same as that of the information processing unit 20. In the present embodiment, for the sake of simplicity, a case in which the grid computing system 10 has one job execution request generation unit 30, and the execution request generation unit 30 does not have the function same as that of the information processing unit 20, will be described.

The information processing unit 20 stores identification information of an information processing unit or units, whose processing capabilities, indicated by indexes, satisfy a predetermined basic condition, the indexes different types of processing capabilities of an information processing unit, in advance in a way that the identification information is associated with each of the indexes. For example, in FIG. 1, among the information processing units connected to the information processing unit 20, connections between the information processing unit 20 and each information processing unit in which the operation frequency of a CPU therein is not lower than a predetermined value are illustrated with dotted lines. Similarly, connections between the information processing unit 20 and each information processing unit, whose memory capacity is not lower than a predetermined value, are illustrated with solid lines.

On acquiring the job execution request from the information processing unit A, the information processing unit 20 determines whether the job should be executed by the information processing unit 20. When determining that the job should not be executed by the information processing unit 20, the information processing unit 20 selects information processing units in which the respective operation frequencies of the CPUs therein are not lower than a predetermined one. From among these information processing units, the information processing unit 20 selects an information processing unit or units satisfying a predetermined condition. For example, the information processing unit 20 selects the information processing unit B from among the information processing units B, D, E, G, and I, and then transfers the job execution request to the information processing unit B. The information processing unit B determines the job execution request not to be transferred, hence executing the job.

Therefore, in the grid computing system 10 according to the present embodiment, each of the information processing units is, by itself, capable of selecting an information processing unit which should execute a job, without providing any specific job management server. Moreover, the information processing unit 20 according to the present embodiment stores a set of identification information of information processing units, each of which is a candidate for destination to be transferred, in a way that the identification information is associated with the different types of processing capabilities. It is thereby possible to quickly determine a pertinent information processing unit for a requested job to be transferred.

Meanwhile, each of the information processing units A to I according to the present embodiment may have a configuration almost same as that of the information processing unit 20. Therefore, the information processing unit 20 will be described in the following embodiments.

FIG. 2 is a functional block diagram of the information processing unit 20. The information processing unit 20 has a self-index storage section 200, an other-connected-information-processing-unit index value storage section 210, a request acquiring section 220, a job history storage section 230, a job execution section 240, a condition-satisfying-unit information storage section 250, a condition-satisfying-unit selection section 260, a request transmission section 270, and an index value addition section 280. The self-index storage section 200 stores an index value indicative of the processing capacity of the information processing unit 20.

The other-connected-information-processing-unit index value storage section 210 stores index values indicative of the processing capacities of information processing units, in a way that the index values are respectively associated with the plurality of information processing units connected to the information processing unit 20. Further, when the other-connected-information-processing-unit index value storage section 210 receives, from another information processing unit connected to the information processing unit 20, a notice of change for informing that there is a change in the index value indicative of the processing capability of the another information processing unit, it changes the stored index value according to the notice of change thus received. For example, the other-connected-information-processing-unit index value storage section 210 changes the stored index value to an index value that represents a processing capacity being lower than that represented by the stored index value.

Here, an information processing unit connected to the information processing unit 20 is, for example, one which communicates with the information processing unit 20 without being hooked up to a router. However, alternatively, an information processing unit connected to the information processing unit 20 may be one which communicates with the information processing unit 20 through a predetermined number of routers or less. Furthermore, as another example, an information processing unit connected to the information processing unit 20 may be determined by a user in advance.

The request acquiring section 220 acquires a job execution request from the information processing unit A. The job execution request includes, for example, the identification information of the job execution request generation unit 30 having generated the job execution request, an index indicative of a processing capacity which is required for executing the job, a determining criterion (criteria) which an information processing unit to execute the job is required to satisfy, the amount of variation where the index varies when the job is executed, a date and time on which the job is required, and the identification information of the job.

The job history storage section 230 stores the history of the identification information of a job execution request which the request acquiring section 220 acquires. Then, the request acquiring section 220 returns the job execution request to the information processing unit A which is the source of transfer of the job, when the identification information of the acquired job execution request is included in the history stored in the job history storage section 230. It is thereby possible to prevent the job execution request from being circulated in transferring actions. Meanwhile, the job history storage section 230 stores the identification information of the job execution request in a way that the identification information is associated with the date and time on which the job execution request is acquired, and may delete the identification information when a predetermined period of time elapses after having acquired it.

The job execution section 240 determines whether the job should be executed by the information processing unit 20, on the basis of an index value stored in the self-index value storage section 200, and the contents of the job required by the job execution request. In addition, the job execution section 240 may further determine whether the job should be executed by the information processing unit 20, on the basis of an index value stored in the other-connected-information-processing-unit index value storage section 210. The job execution section 240 determines the job to be executed even when the request transfer section 270 receives a return on the job execution request.

When the job execution section 240 determines the job to be executed, it transmits a notice of execution for informing that the information processing unit 20 will execute the job to the job execution request generation unit 30. The job execution section 240 then starts executing the job upon receiving data and the like, which are required to execute the job, from the job execution request generation unit 30. In this case, the job execution section 240 changes the index value in the self-index value storage section 200 following the execution of the job. Furthermore, the job execution section 240 transmits, to the information processing units A to I, a notice of change to change the index value indicative of the processing capability of the information processing unit 20.

Moreover, when the information processing unit 20 is newly connected to a network, the job execution section 240 may transmit, to the information processing units A to I, as a notice of change, an index value indicative of the processing capability of the information processing unit 20 along with information informing that the information processing unit 20 is newly connected to the network. Meanwhile, when the information processing unit 20 is disconnected from the network, the job execution section 240 may transmit, to the information processing units A to I, as a notice of change, an index value indicative of the processing capability of the information processing unit 20 along with information informing that the information processing unit 20 is disconnected from the network.

From among the plurality of information processing units connected to the information processing unit 20, the condition-satisfying-unit information storage section 250 stores identification information of an information processing unit or units, whose processing capabilities, indicated by a plurality of indexes, satisfy a predetermined basic condition, the plurality of indexes indicating different types of processing capabilities of an information processing unit, in a way that the identification information is associated with each of the plurality of indexes. For example, from among the information processing units connected to the information processing unit 20, the condition-satisfying-unit information storage section 250 stores the identification information of an information processing unit or units, in which the operation frequency(s) of the CPU(s) therein are 1 GHz or more in a way that the identification information is associated with an index indicating the operation frequency of a CPU.

The condition-satisfying-unit selection section 260 selects identification information corresponding to an index indicating a processing capability required to execute the job from the condition-satisfying-unit information storage section 250, on the basis of the contents of the job required by the job execution request. When the job is determined not to be executed by the information processing unit 20, the request transmission section 270 transfers the job execution request to any one of the information processing units indicated by the identification information selected by the condition-satisfying-unit selection section 260.

For example, the request transmission section 270 selects, from the other-connected-information-processing-unit index value storage section 210, the index values of the information processing units indicated by the identification information selected by the condition-satisfying-unit selection section 260. Next, the request transmission section 270 selects index values satisfying a predetermined condition, from among the index values previously selected, and transfers the job execution request to the information processing units corresponding to the above selected index values. For example, the request transmission section 270 may transfer the job execution request to the information processing units, for each of which the rate of use of a CPU is not higher than a predetermined rate. When receiving a return from an information processing unit to which the job execution request has been transferred, the request transmission section 270 gives a notice of the return to the job execution section 240 via the request acquiring section 220.

When receiving an adding instruction, from a user, for adding other indexes to indicate the processing capabilities of information processing units, the index value addition section 280 notifies a method of calculation for calculating the index values of the indexes and a basic condition which the index values are required to satisfy in order to store identification information in the condition-satisfying-unit information storage section 250, to other information processing units. This notification is referred to as an addition notice. Further, the index value addition section 280 causes the self-index value storage section 200 to calculate an index value on the index of the information processing unit 20, and to store the calculated index value therein. Moreover, the index value addition section 280 sets a basic condition(s) which the calculated index value is required to satisfy, in the condition-satisfying-unit information storage section 250.

FIG. 3 is an example of the data arrangement of the other-connected-information-processing-unit index value storage section 210. The other-connected-information-processing-unit index value storage section 210 stores indexes of characteristics indexes indicative of the characteristics of a device provided in each of the plurality of information processing units or a software installed in the same information processing unit, as an index value which indicates the processing capability of the information processing unit, in a way that the indexes are respectively associated with the plurality of information processing units connected to the information processing unit 20. To be more specific, the other-connected-information-processing-unit index value storage section 210 stores the operation frequencies of the CPUs in the information processing units, the capacities of the memories thereof, and the kinds of the OSes installed therein as characteristics indexes of the information processing units, in a way that these indexes are associated with the identification information (IDs) of the information processing units.

Furthermore, the other-connected-information-processing-unit index value storage section 210 stores index values for load indexes indicative of processing loads of jobs under being processed by information processing units as indexes indicative of processing capabilities of the information processing units. Specifically, the other-connected-information-processing-unit index value storage section 210 stores the rates of use of CPUs in the information processing units and the rates of use of memories therein as the load indexes of the information processing units in a way that the load indexes are associated with the identification information (IDs) of the information processing units.

For example, in the information processing unit A, the operation frequency of the CPU thereof is 1.6 GHz, the capacity of the memory thereof is 64 MB, and the operating system is the X. Further, the rate of use of the CPU thereof is 90%, and the rate of use of the memory is 80%. In addition to this example, the characteristics index may be an index indicative of the kind of a CPU, and an index indicative of the capacity and/or speed of a hard disk. In addition to this example, furthermore, the load index may be an index indicative of the available space of the hard disk.

In this manner, the processing capability of an information processing unit in the present embodiment may be a capability which is static and non-variable, for example, such as a performance of an information processing unit, or a capability which is dynamically changeable, for example, such as extra calculation power thereof.

FIG. 4 is an example of the data arrangement of the condition-satisfying-unit information storage section 250. The condition-satisfying-unit information storage section 250 stores identification information of an information processing unit or units, whose processing capabilities, indicated by characteristics indexes, satisfy a predetermined condition, in a way that the identification information is associated with each of the characteristics indexes. For example, the condition-satisfying-unit information storage section 250 stores A, B, D, E, G, and I as a set of identification information of the information processing units, of which the operation frequencies of the CPUs satisfy the predetermined condition where an operation frequency is 1 GHz or more. Further, the condition-satisfying-unit information storage section 250 stores C, F, H, and I as a set of identification information of the information processing units, of which the capacities of the memories satisfy a predetermined condition where the capacity of a memory is 124 MB or more. Furthermore, the condition-satisfying-unit information storage section 250 stores A, B, D, F, H, and I as a set of identification information of the information processing units, the OSes of which satisfy a predetermined condition where the kind of an OS is the X.

In this manner, the basic condition as described above may be such that a device such as a CPU and the like has a capability not less than a predetermined criterion capability, and a device or a software is of a kind which is a predetermined one. Furthermore, for an information processing unit which satisfies the plurality of conditions, the condition-satisfying-unit information storage section 250 may store the identification information of the information processing unit, in a way that the identification information of the information processing unit is associated with the plurality of indexes. That is, the condition-satisfying-unit information storage section 250 may store the identification information I of the information processing unit I, in a way that the identification information I of the information processing unit I is associated with the indexes indicating the operation frequency of a CPU, the capacity of a memory, and the kind of an OS.

In the following description, the information processing units A, B, D, E, G, and I are referred to as virtual adjacent nodes with respect to the operation frequency of a CPU. In the same manner, the information processing units C, F, H, and I are referred to as virtual adjacent nodes with respect to the capacity of a memory. In the same manner, the information processing units A, B, D, F, H, and I are referred to as virtual adjacent nodes with respect to an OS.

FIG. 5 is a functional block diagram of the job execution request generation unit 30. The job execution request generation unit 30 includes a job execution request transmission section 300 and a job execution instruction section 310. The job execution request transmission section 300 generates a job execution request asking for execution of a job, when an instruction is given by a user to execute the job. Then, the job execution request transmission section 300 transmits the job execution request thus generated to two information processing units or more, for example, to each of the information processing units A and C.

At the same time, the job execution request transmission section 300 transmits the job execution request including the identification information of the job execution request generation unit 30 which has generated the job execution request and a prediction value showing the amount of calculation resource to be used when the job is executed. Here, the prediction value of the amount of calculation resource designates, for example, a prediction value for the size of a memory which is occupied by the job. This prediction value may be inputted by a user who gives an instruction of an execution of a job or may be obtained by executing a part of the job.

Meanwhile, the job execution request does not include data and the like for the actual execution of the job. That is, the job execution request is provided into any one of the information processing units in the grid computing system 10, in order to search for the information processing unit capable of executing the job. Here, it is assumed that the job execution request transmitted to the information processing unit A is transferred to the information processing unit B, and that the information processing unit B has determined to execute the job. In addition, it is assumed that the job execution request transmitted to the information processing request C is not transferred, and that the information processing request C has determined to execute the job.

The job execution instruction section 310 receives a notice of execution for informing of the execution of the job, from each of the information processing units B and C, in response to the transmitted job execution request. From among the plurality of information processing units that transmitted the notices of execution, the job execution instruction section 310 selects an information processing unit that satisfies predetermined condition(s). For example, when receiving the notices of execution from the information processing units B and C, the job execution instruction section 310 selects an information processing unit B, which satisfies the condition where the rate of use of a CPU is 30% or less.

Next, the job execution instruction section 310 causes the selected information processing unit B to execute the job. For example, the job execution instruction section 310 may transmit programs and data required to execute the job, to the information processing unit B.

In this manner, when receiving a plurality of notices of execution, the job execution request generation section 30 selects a single information processing unit which is appropriate for executing the job, and then causes the selected information processing unit to execute the job.

FIG. 6 is a flowchart showing processes for transferring or execution of a job performed by the information processing unit 20. The request acquiring section 220 acquires a job execution request from the information processing unit A (S600). Then, the job acquiring section 220 determines whether it has already received the job execution request in the past (S610). If the job execution request has already been received in the past (S610: YES), the job acquiring section 220 returns the job execution request to a source of transfer of the job (e.g., information processing unit A). Here, the source of transfer of the job is an information processing unit as a recipient of the job, which directly received the job execution request. For example, in the present embodiment, a source of transfer in the information processing unit 20 is the information processing unit A. Further, in the information processing unit A, a source of transfer is the execution request generation unit 30. Alternatively, the request acquiring section 220 may return the job execution request to the job execution request generation unit 30.

To be more specific, the request acquiring section 220 determines whether it received the job execution request in the past, by means of any one of the following approaches. The first example is that when the identification information of the job execution request is included in the histories stored in the job history storage section 230, the request acquiring section 220 determines that it received the job execution request in the past. The second example is that in a case where the request acquiring section 220 receives the job execution request including job transfer history information to be the identification information of an information processing unit which transferred the job execution request in the past, when the identification information of the information processing unit 20 is included in the job transfer history information, the request acquiring unit 220 determines that it received the job execution request in the past.

Meanwhile, in place of this, when the number of times of transfers, in which the job execution request was transferred in the past, is not less than a predetermined criterion number of times, the request acquiring section 220 may return the job execution request to an information processing unit as a source of transfer of the job execution request. To be more specific, with the job execution request including the number-of-times-of-transfers information showing the number of times in which the job execution request has been transferred, when the number-of-times-of-transfers information shows the number of times being not less than a predetermined number of times, the request acquiring section 220 returns the job execution request to an information processing unit as a source of transfer of the job execution request.

On the other hand, when the request acquiring section 220 did not receive the job execution request in the past (S610: NO), the job execution section 240 analyzes the contents of process the job was processed (S630). Alternatively, for example, the job execution section 240 may have a choice that it acquires, from the job execution request, a characteristics index indicative of a processing capability required for executing the job, and analyzes the contents of process of the job. The job execution section 240 determines whether the job should be executed by the information processing unit 20, on the basis of an index value stored in the self-index value storage section 200 and the contents of process of the job (S640). For example, the job execution section 240 determines the job to be executed by the information processing unit 20, when Expression 1 below is satisfied.

$$|\text{target} - \text{efficiency}| \leq \frac{\text{alpha}}{1 - \frac{1}{\exp(\text{threshold} - \text{counter})}} \quad \text{(Expression 1)}$$

where the variable "threshold" shows an upper limit for the number of times of transfers, which is the number of times in which the job execution request has been transferred, until an information processing unit to be used for executing the job is determined. The variable "target" is an index value indicative of a processing capability required for executing the job. The variable "efficiency" is an index value stored in the self-index value storage section 200. The variable "counter" is the number of times of transfers of the job execution request.

As it is clear from Expression 1 described above, the job execution section 240 determines the job to be executed by the information processing unit 20, when an index value stored in the self-index value storage section 200 indicates a processing capability higher than that required for executing the job. However, even when an index value stored in the self-index value storage section 200 indicates a processing capability lower than that required for executing the job, if the difference between the index value and an index value indicative of the capability required for executing the job is within a predetermined criterion difference value, the job execution section 240 determines the job to be executed by the information processing unit 20.

Moreover, when a cumulative number of times of transfers, that is the number of times in which the job execution request has been transferred by other information processing units, is relatively larger, the job execution section 240 sets the above described criterion difference value to be a larger value, compared with that for the cumulative number of times of transfers that is smaller. That is, a possibility that the job is executed tends to be higher, when the cumulative number of times of transfers is larger. Hence, it becomes possible to prevent a searching domain for searching for information processing units to effect the execution of the job, from being divergent.

Meanwhile, as an alternative to this example, the job execution section 240 may determine whether the job is executed by the information processing unit 20, on the basis of sets of a plurality of index values. Further, as another example, the job execution section 240 may determine whether the job is executed by the information processing unit 20, on the basis of the indexes of the information processing units A to I connected to the information processing unit 20. As a specific example, the job execution section 240 may determine whether the job is executed by the information processing unit 20, when an index value stored in the self-index value storage section 200 indicates a processing capability which is higher, even compared with that indicated by any one of indexes stored in the other-connected-information-processing-unit index value storage section 210.

Subsequently, when the job execution section 240 determines the job to be executed by the information processing unit 20 (S640: YES), it executes the job (S650). In the meantime, when the job is determined not to be executed by the information processing unit 20, the request transmission section 270 transfers the job execution request (S660).

FIG. 7 shows the details of processes in S650 shown in FIG. 6. The job execution section 240 transmits a notice of execution to the job execution request generation unit 30 which generates a job execution request (S700), when a requested job is determined to be executed by the information processing unit 20. The job execution section 240 acquires, from the job execution request, a prediction value on the amount of change where an index value changes when the job is executed, and changes the index value according to the prediction value (S710). For example, the job execution section 240 changes an index value indicating the rate of use of a CPU to that indicating the rate of use of the CPU being 100%.

In this way, the information processing unit 20 is capable of restraining an easy acceptance of the transfer of other job execution requests. That is, the information processing unit 20 can adequately adjust the acquisition of resource performed by a plurality of job execution requests. Use of the above approach enables the information processing unit 20 to flexibly effect scheduling of jobs, compared with employment of a lock mechanism which causes the information processing unit 20 to completely inhibit the acceptance of any job execution request.

Next, the job execution section 240 transmits a notice of change for changing the index value indicative of the processing capability of the information processing unit 20, to the information processing units A to I (S720). When receiving a job corresponding to a notice of execution from the job execution request generation unit 30 (S730: YES), the job execution section 240 undoes the change in the index value (S740). The job execution section 240 thereafter executes the job thus received (S750). In this case, on the basis of the processing capability that changes when the job is executed, the self-index storage section 200 changes the index value stored therein to an index value indicative of the processing capability of the information processing unit, that is lower, compared with the processing capability indicated by the index value stored as above.

The job execution section 240 transmits a notice of change for changing the index value indicative of the processing capability of the information processing unit 20, to the information processing units A to I (S760). In this case, the job execution section 240 may transmit this notice of change with the identification information of a job to be executed included in the notice. When the execution of the job terminates, the job execution section 240 returns the results of the execution to the job execution request generation unit 30 (S770).

Incidentally, in addition to the processes shown in FIG. 7, even when the information processing unit 20 is newly connected to the grid computing system 10, the job execution section 240 calculates the index value of the information processing unit 20, and transmits a notice of change indicative of the index value thus calculated, to other information processing units for notification. In a similar manner, when the information processing unit 20 suspends connecting with the grid computing system 10, the job execution section 240 may transmit a notice of change indicative of deleting of the index value of the information processing unit 20.

FIG. 8 shows the details of processes in S660 shown in FIG. 6. The condition-satisfying-unit selection section 260 selects, from the condition-satisfying-unit information storage section 250, identification information corresponding to a characteristics index indicative of a processing capability required for executing a job, on the basis of the contents of process of the job (S800). For example, when a processing capability required for a job is mainly the computing power of a CPU, the condition-satisfying-unit selection section 260 selects virtual adjacent nodes with respect to the operation frequency of the CPU. The request transmission section 270 then selects information processing units, the index values of load indexes of which satisfy a predetermined condition(s), from among the virtual adjacent nodes selected by the condition-satisfying-unit selection section 260 (S810). As a result, for example, the request transmission section 270 may select the information processing unit B.

The request transmission section 270 adds one to the number-of-times-of-transfers information showing the number of times in which the job execution request has been transferred (S820). The request transmission section 270 transmits the job execution request to the information processing unit B with the number-of-times-of-transfers information included in the job execution request (S830). In addition to this, the request transmission section 270 may transfer the job execution request with the identification information of the information processing unit 20 included therein as history information indicating the history of an information processing unit or units which transferred the job execution request.

Meanwhile, when the job execution request which the request transmission section has transmitted is returned from the information processing unit B, the job execution section 240 may execute a job corresponding to the job execution request. Hence, it becomes possible to prevent the job execution request from being circulated, and also to perform the search of an information processing unit being appropriate for executing the job, within a limited range not causing the circulation of the job execution request.

FIG. 9 is a flowchart showing processes in the case that the information processing unit 20 receives a notice of change. Referring to FIG. 9, a description will be given of the processes in a case where an information processing unit other than the information processing unit 20 executes a job, and as a result, the index value of the information process unit is changed. When receiving the identification information of the job, which has caused an index value to change, with the identification information included in a notice of change, the other-connected-information-processing-unit index value storage section 210 determines whether the information processing unit 20 has already received the notice of change in the past (S900). If the notice of change has already been received in the past (S900: YES), the information processing unit 20 terminates the process.

On the other hand, if it is the first time to receive it (S900: NO), the other-connected-information-processing-unit index value storage section 210 changes an index value stored therein, with the index value associated with the information processing unit to execute the job, to an index value which indicates a processing capability of the information processing unit, the processing capability being lower than that indicated by the stored index value (S910).

Subsequently, the self-index value storage section 200 determines whether the change of the index value of the information processing unit 20 is necessary (S920). For example, when the self-index value storage section 200 further stores an index value based on the processing capabilities of the information processing units A to I connected to the information processing unit 20, the self-index value storage section 200 determines it necessary to change the index value. For example, when the self-index value storage section 200 stores, as an index value, the mean value of the operation frequencies of the CPUs of the information processing units A to I connected to the information processing unit 20, the self-index value storage section 200 determines it necessary to change the mean value.

When it is unnecessary to change the index value (S920: NO), the information processing unit 20 terminates the process. On the other hand, when the self-index value storage section 200 determines it necessary to change the index value (S920: YES), it changes a stored index value on the basis of a received notice of change (S930). Then, the self-index value storage section 200 transmits a notice of change for informing the change of the index value, with the identification information of the job included in the notice of the change, to the information processing units A to I connected to the information processing unit 20 (S940).

In this manner, when an index value in any one of the information processing units is changed, the information processing units exchange the notice of change one another, and thereby each of them can appropriately updates its index value.

FIG. 10A is a flowchart showing processes in the case that the information processing unit 20 is given an additional instruction by a user. When the index value addition section 280 is given by a user an additional instruction for adding another index indicative of the processing capability of an information processing unit, the index value addition section 280 causes the self-index value storage section 200 to store therein an index value based on the additional instruction (S1000).

For example, the index value addition section 280 is given by a user, as additional instructions, an approach of calculation for calculating an index value of the index, and a basic condition that should be satisfied by the index value in order to cause the condition-satisfying-unit information storage section 250 to store the identification information. The index value addition section 280 may then inform the approach of calculation to the self-index value storage section 200, and cause the self-index value storage section 200 to calculate an index value and to store it therein. In addition to this, the index value addition section 280 may receive the definition and the name of the index. In this case, the index value addition section 280 may further store the definition and the name of the index in the self-index value storage section 200.

The self-index value storage section 200 transmits a notice of change for informing that the index value of the information processing unit 20 is newly calculated, to the information processing units A to I connected to the information processing unit 20 (S1010). Next, the index value addition section 280 sets its basic condition to the condition-satisfying-unit information storage section 250 (S1020). Then, the index value addition section 280 transmits, as a notice of addition for informing that an index value is newly added, the approach of calculation for calculating the index, the definition and name thereof, and the basic condition, to all other information processing units (S1030).

FIG. 10B is a flowchart showing processes in the case that the information processing unit 20 receives a notice of addition from other information processing units. The index value addition section 280 receives a notice of addition including a basic condition from other information processing units. The index value addition section 280 detects an information processing unit, the index value of which satisfies the basic condition, from among other information processing units connected to the information processing unit 20, on the basis of the basic condition included in the notice of addition (S1040).

For example, the index value addition section 280 may receive the index values of other information processing units connected to the information processing unit 20, via the other-connected-information-processing-unit index value storage section 210, and may determine whether the index value received satisfies the basic condition. The index value addition section 280 stores, in the condition-satisfying-unit information storage section 250, the identification information of the information processing unit detected as described above, with the identification information associated with the index value to be added (S1050).

As described in FIGS. 10A and 10B, a user can add an index value into each of the plurality of information processing units within the grid computing system 10 by inputting an additional instruction in an information processing unit.

FIG. 11 is a flowchart showing processes in the case that the job execution request generation unit 30 is given an instruction for executing a job by a user. The job execution request transmission section 300 generates a job execution request, and transmits the generated job execution request to the information processing units A and C (S1100). Preferably, the job execution request transmission section 300 generates the identification information of a job, the execution of which is asked for by the job execution request, and transmits the identification information in a state that it is included in the job execution request. For example, the job execution request transmission section 300 may generate the identification information of the job, on the basis of the time when the job execution request is generated, and identification information to identify an information processing unit to which the job execution request is transmitted.

Further, the job execution request transmission section 300 determines whether it receives back the job execution request (S1105) from the information processing units A and C. When receiving back the job execution request therefrom (S1105: YES), the job execution request transmission section 300 returns the process to the step S1100, and transmits the job execution request to information processing units other than the information processing units A and C.

When the job execution request transmission section 300 does not receive back the job execution request (S1105: NO), the job execution request transmission section 300 determines whether a predetermined criterion period of time has elapsed after having transmitted the job execution request (S1110). When the predetermined criterion period of time has elapsed (S1110: YES), the job execution instruction section 310 selects an information processing unit which has the highest processing capability, from among a plurality of information processing units from which a plurality of notices are received within the criterion period of time (S1120). The job execution instruction section 310 then transmits a program, data, and the like required for executing the job, to the information processing unit thus selected (S1130).

Alternatively, when receiving a plurality of notices of execution, the job execution instruction section 310 may select an information processing unit, causing its notice of execution to arrive at the job execution request generation unit 30 earlier than the others, and may cause the selected information processing unit to execute the job. Furthermore, the job execution instruction section 310 may determine which information processing unit should execute the job, on the basis of time required until it receives a notice of execution after having transmitted a job execution request, and of an arbitrary policy based on a combination of the processing capabilities of the information processing units from which the notices of execution are received.

FIG. 12 shows an example of the hardware arrangement of the information processing unit 20. The information processing unit 20 includes the peripheral part of a CPU having a CPU 1200, a RAM 1220, and a graphic controller 1275, all of which are connected one another via a host controller 1282; an input-output part having a communication interface 1230, a hard disk drive 1240, and a CD-ROM drive 1260, all of which are connected via an input-output controller 1284 to the host controller 1282; and a legacy input-output part having a BIOS 1210, a flexible disk drive 1250, and an input-output chip 1270, all of which are connected to the input-output controller 1284.

The host controller 1282 connects the RAM 1220, with the CPU 1200 and the graphic controller 1275 accessing the RAM 1220 at a high data transmission rate. The CPU 1200 operates based on programs stored in the BIOS 1210 and the RAM 1220, and controls each part. The graphic controller 1275 acquires image data generated on a frame buffer provided in the RAM 1220 by the CPU 1200 and the like, and displays it on a display device 1280. Alternatively, the graphic controller 1275 may include a frame buffer to store image data generated by the CPU 1200 and the like.

The input-output controller 1284 connects the host controller 1282, with a communication interface 1230 being a relatively fast input-output device, the hard disk drive 1240, and the CD-ROM drive 1260. The communication interface 1230 communicates with an exterior device via a network. The hard disk drive 1240 stores a program and data used by the information processing unit 20. The CD-ROM drive 1260 reads a program and data from the CD-ROM 1295, and provides them to the input-output chip 1270 via the RAM 1220.

Further, the input-output controller 1284 is connected to the BIOS 1210, and relatively slow input-output devices such as the flexible disk drive 1250, the input-output chip 1270, and the like. The BIOS 1210 stores a program executed by the CPU 1200 at the time of activating the information processing unit 20, a program dependent on the hardware of the information processing unit 20, and the like. The flexible disk drive 1250 reads a program or data from a flexible disk 1290, and provides it (or them) to the input-output chip 1270 via the RAM 1220. The input-output chip 1270 is connected to the flexible disk 1290, and the various kinds of input-output devices via a parallel port, a serial port, a keyboard port, a mouse port, and the like.

A program to be provided to the information processing unit 20 is provided by a user, with the program stored in any one of recording media such as the flexible disk 1290, the CD-ROM 1295, and an IC card. The program is read out from the recording medium, via the input-output chip 1270 and/or the input-output controller 1284, and is installed in the information processing unit 20 and executed. The operations which the program (e.g. an agent program) installed in the information processing unit 20 and executed causes the information processing unit 20 to perform are the same as those performed by the information processing unit 20 described referring to FIGS. 1 to 11. Accordingly, the description thereof is omitted.

The program described above may be stored in an external recording medium. As the recording medium, besides the flexible disk 1290, the CD-ROM 1295, and the like, it is possible to use optical recording media such as a DVD and a PD, a magneto-optic recording medium such as an MD, a tape medium, a semiconductor memory such as an IC, and the like. A storage device such as a RAM or a hard disk, which is provided in a server system connected to a private communication network and the Internet, may be used as a recording medium, and the program may be provided to the information processing unit 20 via a network.

As described above in the embodiments, the grid computing system 10 sequentially transfers a job execution request asking for execution of a job among a plurality of information processing units. The grid computing system 10 then causes each of the information processing units to determine whether it should execute the job by itself. The grid computing system 10 is thereby capable of causing each of the information processing units to effect scheduling of jobs by itself, without having a specific job management server.

Moreover, the information processing unit 20 records the number of times of transfers of the job execution request, in the job execution request. The information processing unit 20 executes the job at a high probability when the number of times of transfers is relatively larger, compared with a case where the number of times of transfers is smaller. That is, the job tends to be easily executed for every transfer of the job execution request. Therefore, it becomes possible to prevent the job execution request from being circulated, and also to appropriately effect scheduling of the job.

Incidentally, the information processing unit 20 stores identification information of an information processing unit or units, whose index values of a plurality of characteristics indexes, indicating the capabilities of an information processing unit, satisfy a basic condition, as virtual adjacent node(s) for the information processing unit 20, in a way that the identification information is associated with each of the plurality of characteristics indexes. When receiving a job execution request, and determining not to execute the job by itself, the information processing unit 20 selects the identification information corresponding to the characteristics index(es) indicating processing capability(s) required for executing the job. The information processing unit 20 then transfers the job execution request to an information processing unit indicated by any one of pieces of the identification information selected as above. In this way, it becomes possible to appropriately and quickly select an information processing unit to which a job execution request is transferred.

The present invention has been described as above by means of the embodiments. However, the technical scope of the present invention is not limited to the scope described in the above embodiments. It will be apparent to those skilled in the art that various changes or improvements to the above embodiments can be made. It is clear from the claims that an embodiment to which such changes or improvements are made can also be included in the technical scope of the present invention.

BRIEF DESCRIPTION OF THE DRAWINGS

FIG. 3 is an example of the data arrangement of an other-connected-information-processing-unit index value storage section 210.

FIG. 10A is a flowchart showing processes in the case that the information processing unit 20 is given an additional instruction by a user.

FIG. 10B is a flowchart showing processes in the case that the information processing unit 20 receives a notice of addition from another information processing unit.

DESCRIPTION OF REFERENCE NUMERALS

Figure 1:
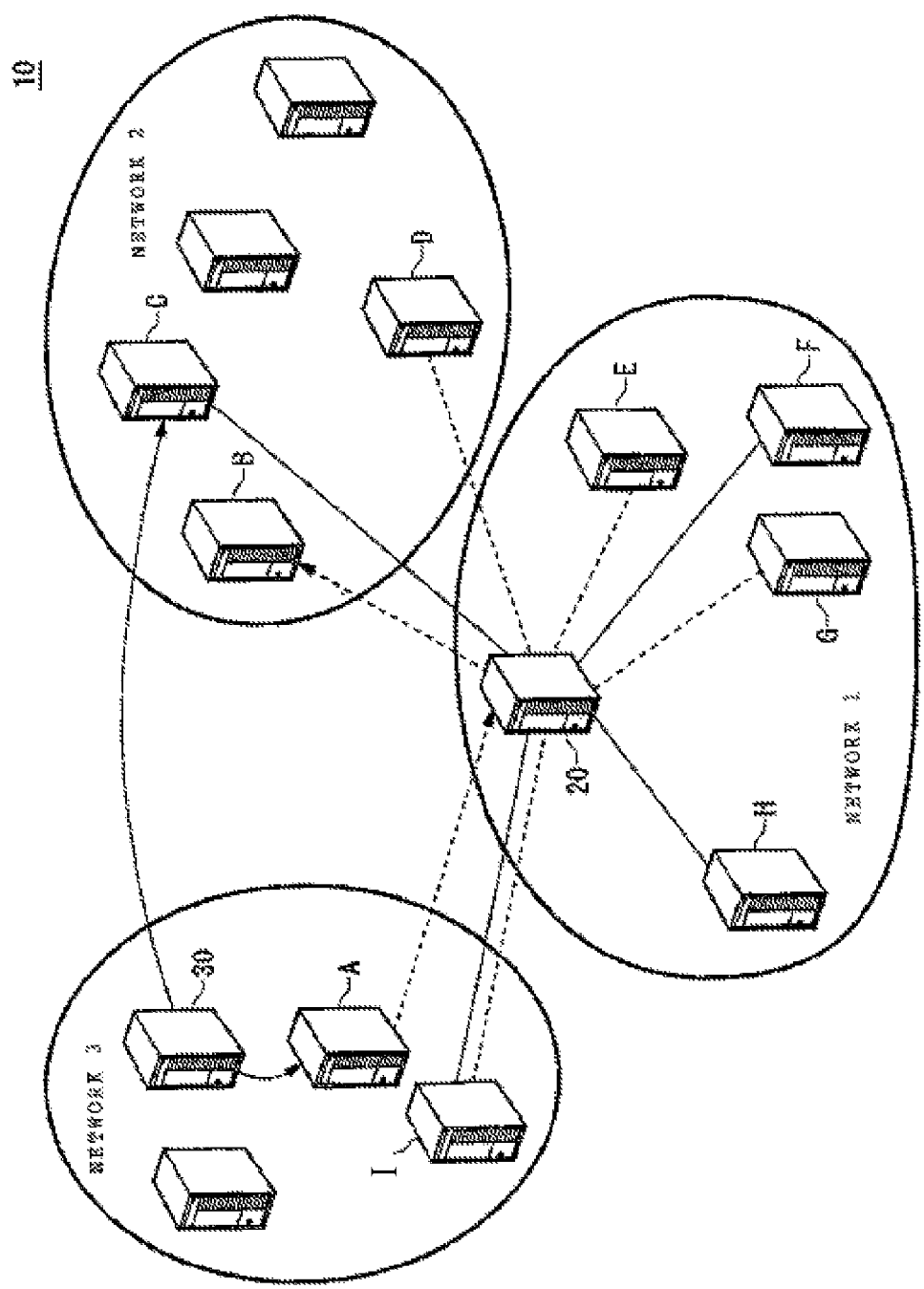
FIG. 1 shows a schematic diagram of a grid computing system 10.
Figure 2:
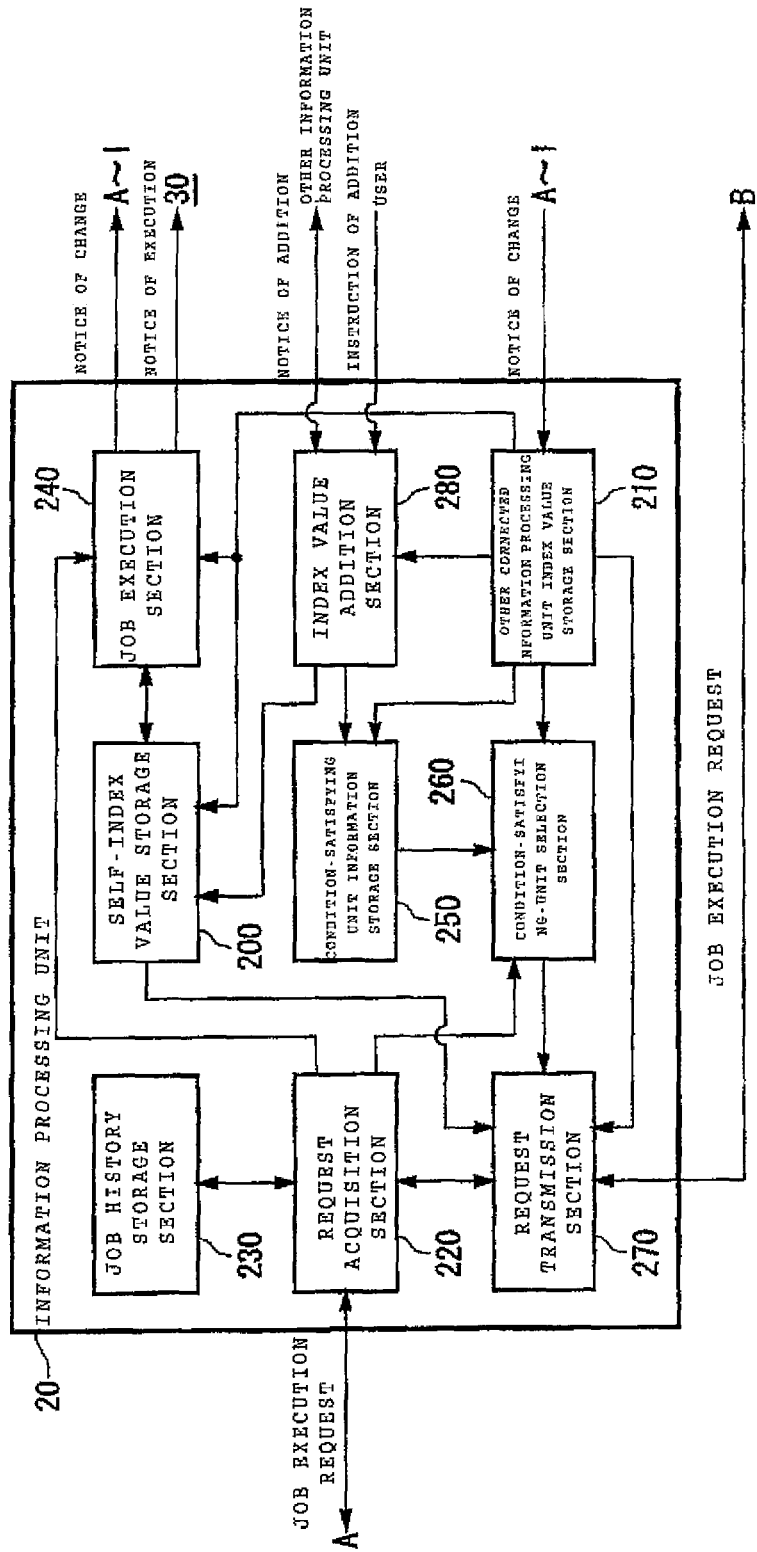
FIG. 2 is a functional block diagram of an information processing unit 20.
Figures 4, 5:
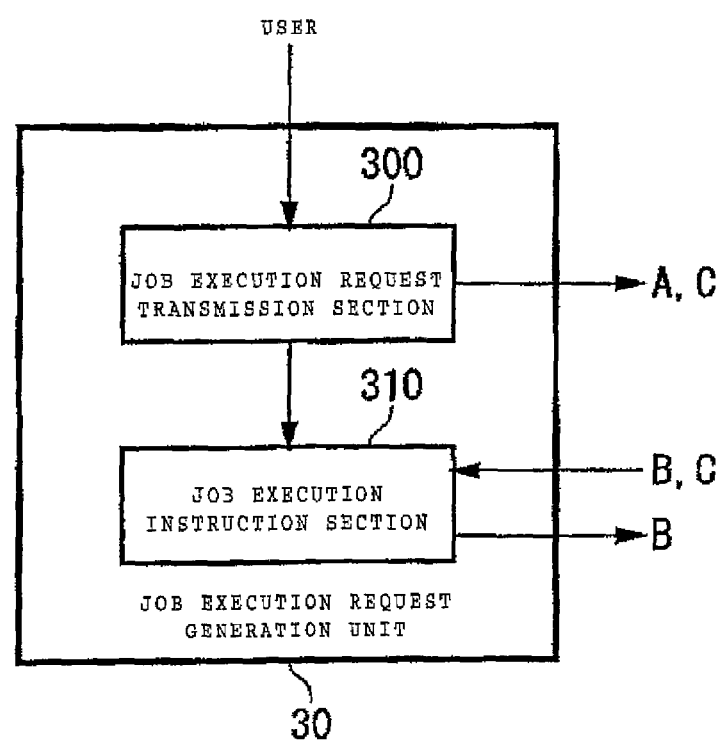
FIG. 4 is an example of the data arrangement of the condition-satisfying-unit information storage section 250.
FIG. 5 is a functional block diagram of the job execution request generation unit 30.
Figure 6:
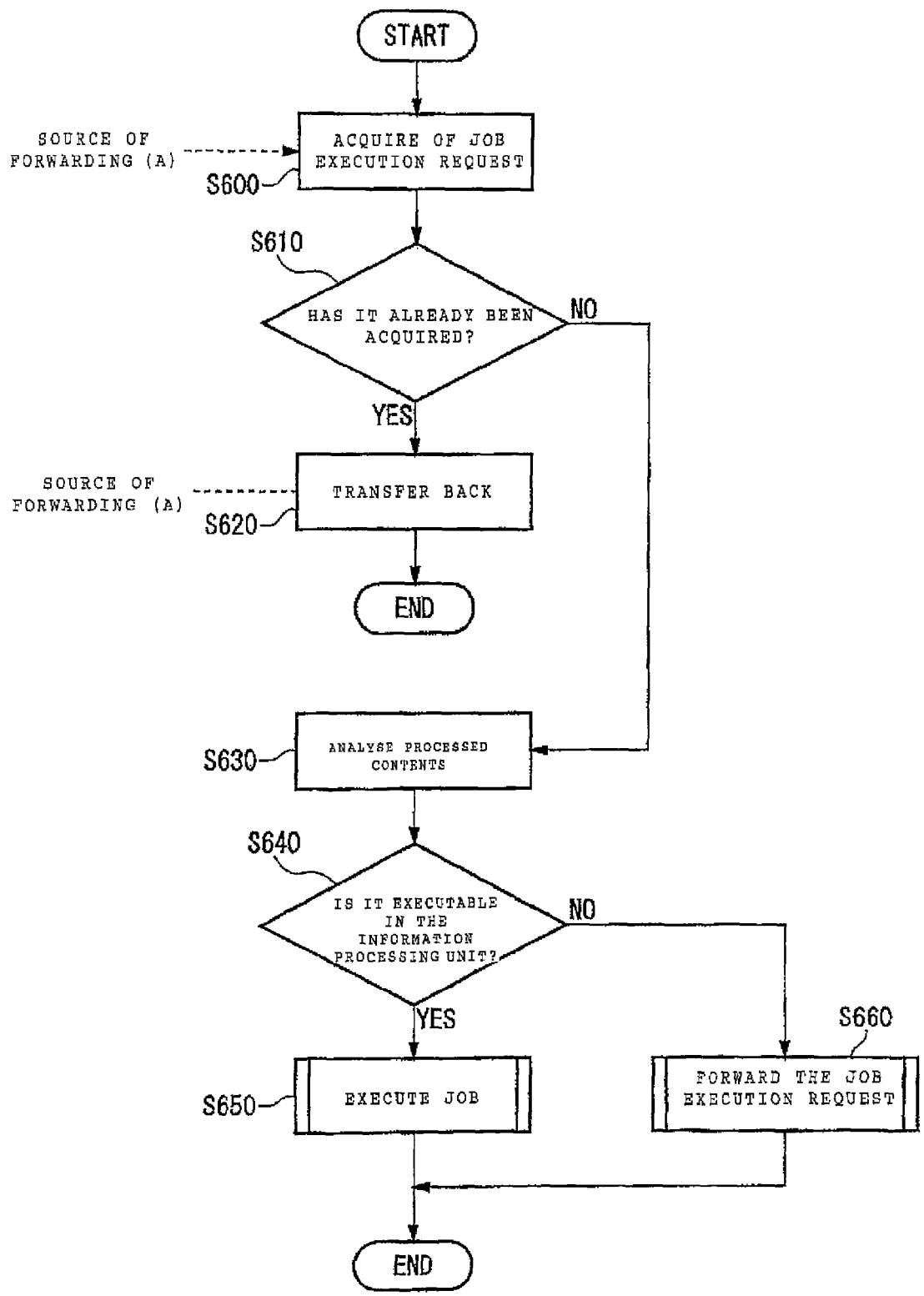
FIG. 6 is a flowchart showing processes for transferring or execution of a job effected by the information processing unit 20.
Figure 7:
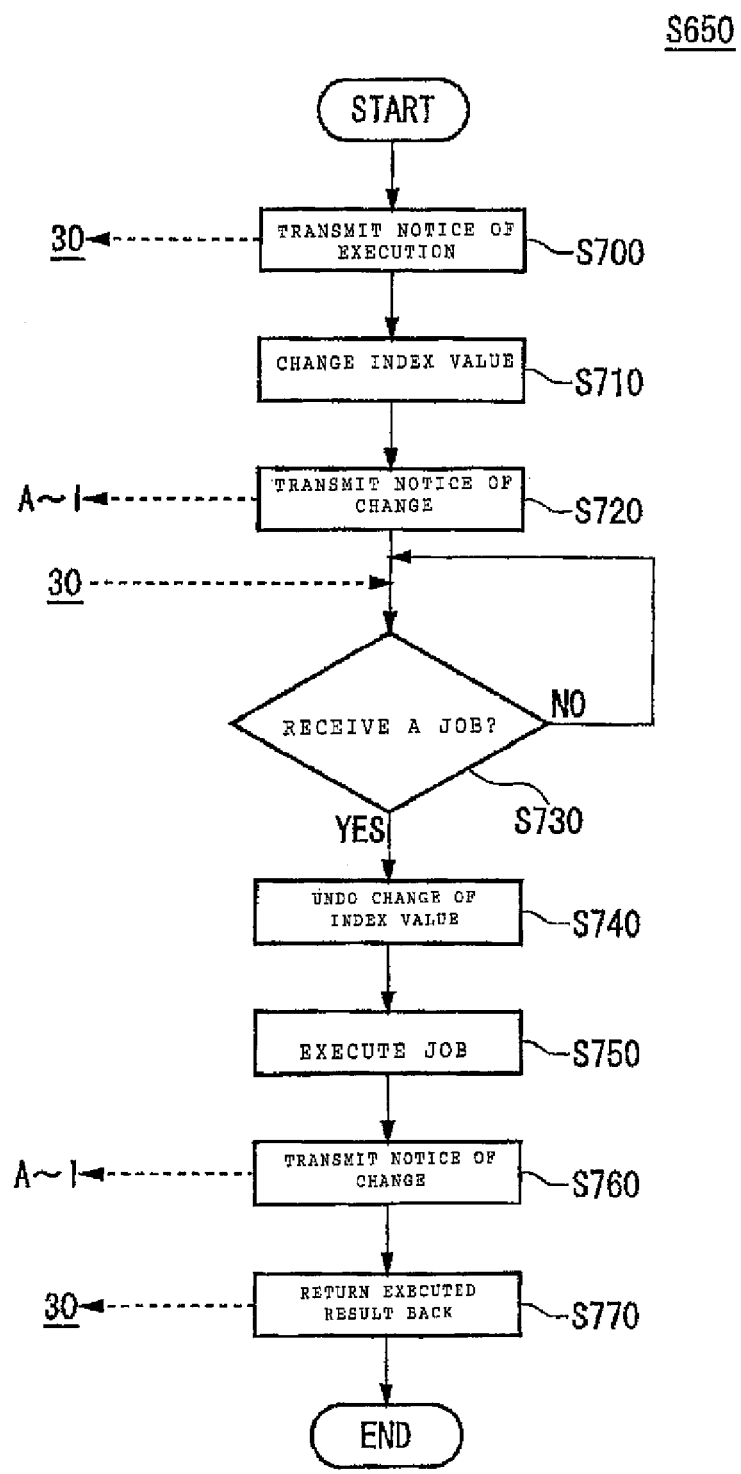
FIG. 7 shows the details of processes in S650 shown in FIG. 6.
Figure 8:
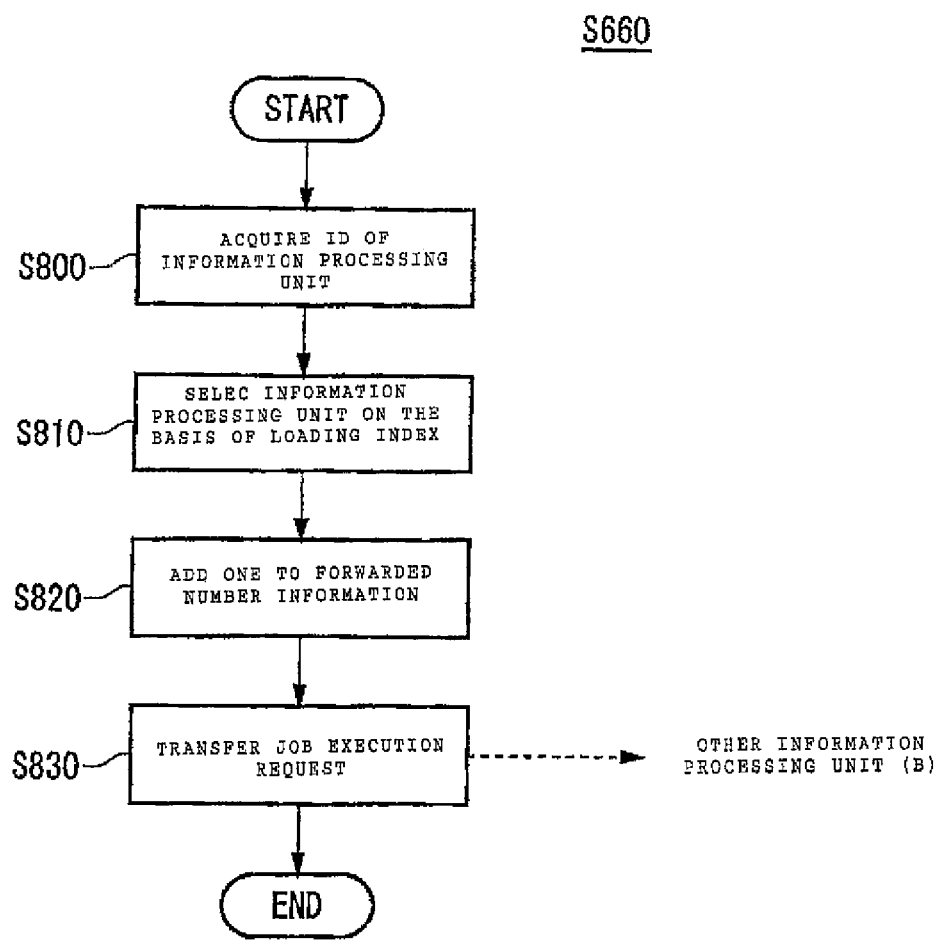
FIG. 8 shows the details of processes in S660 shown in FIG. 6.
Figure 9:
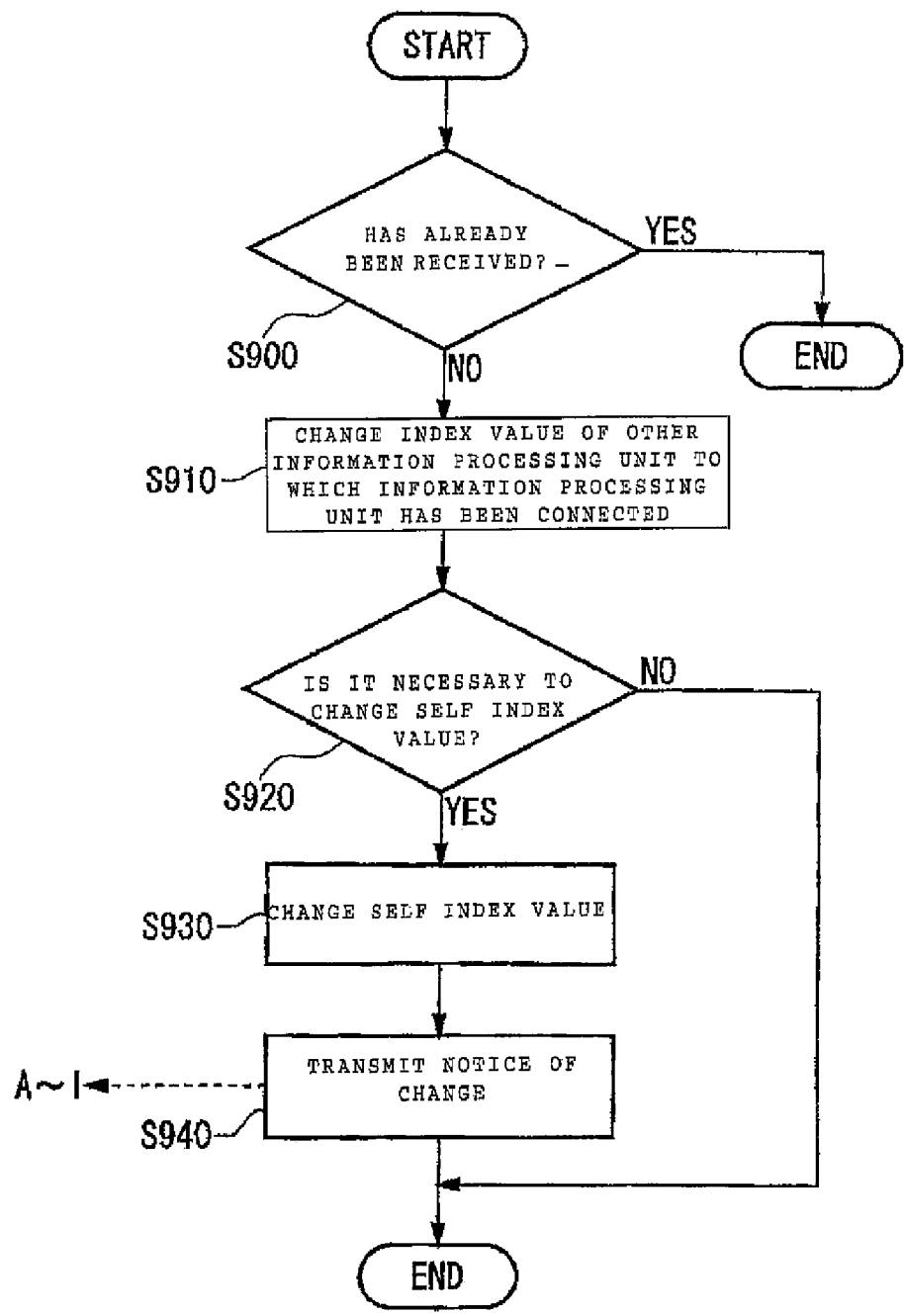
FIG. 9 is a flowchart showing processes in the case that the information processing unit 20 receives a notice of change.
Figure 11:
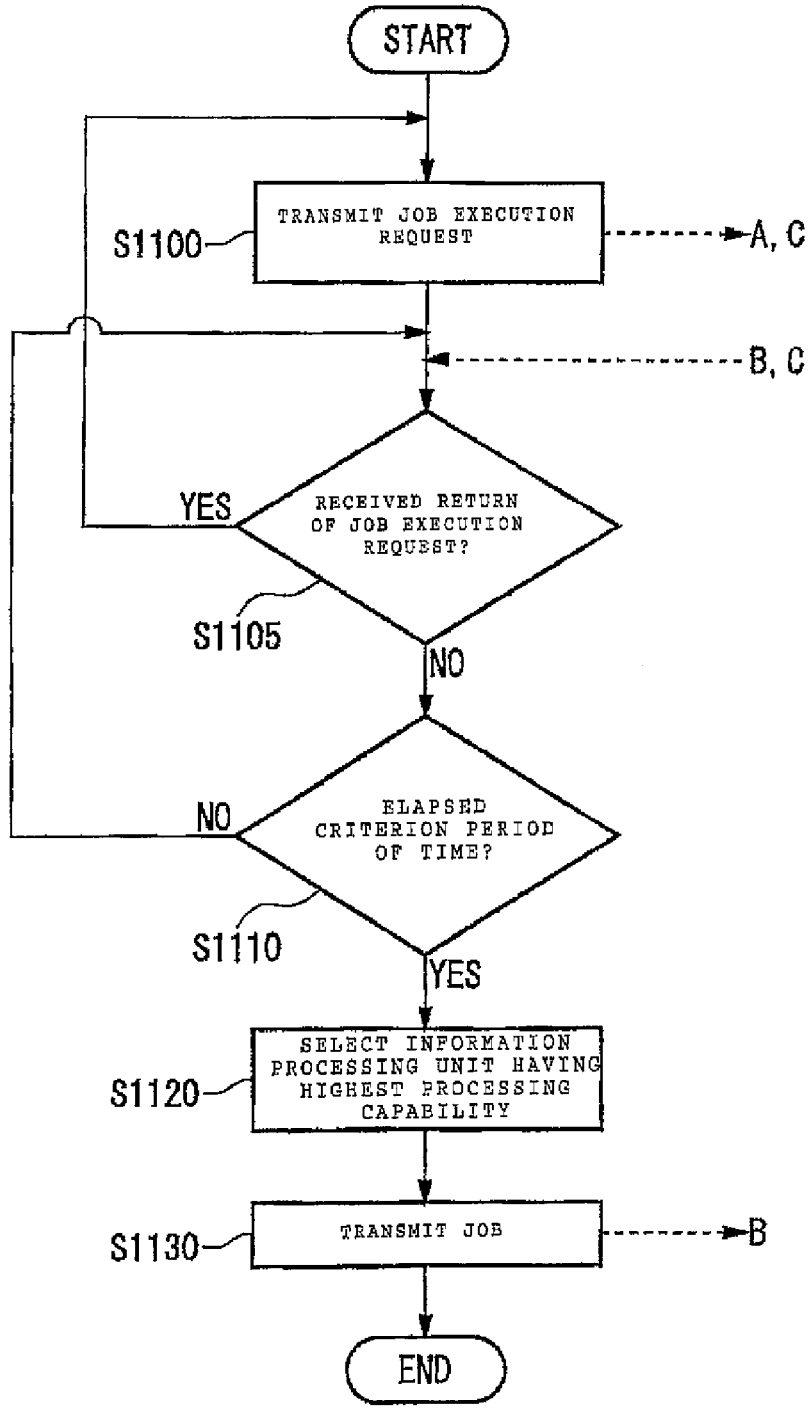
FIG. 11 is a flowchart showing processes in the case that a job execution request generation unit 30 is given an instruction for executing a job by a user.
Figure 12:
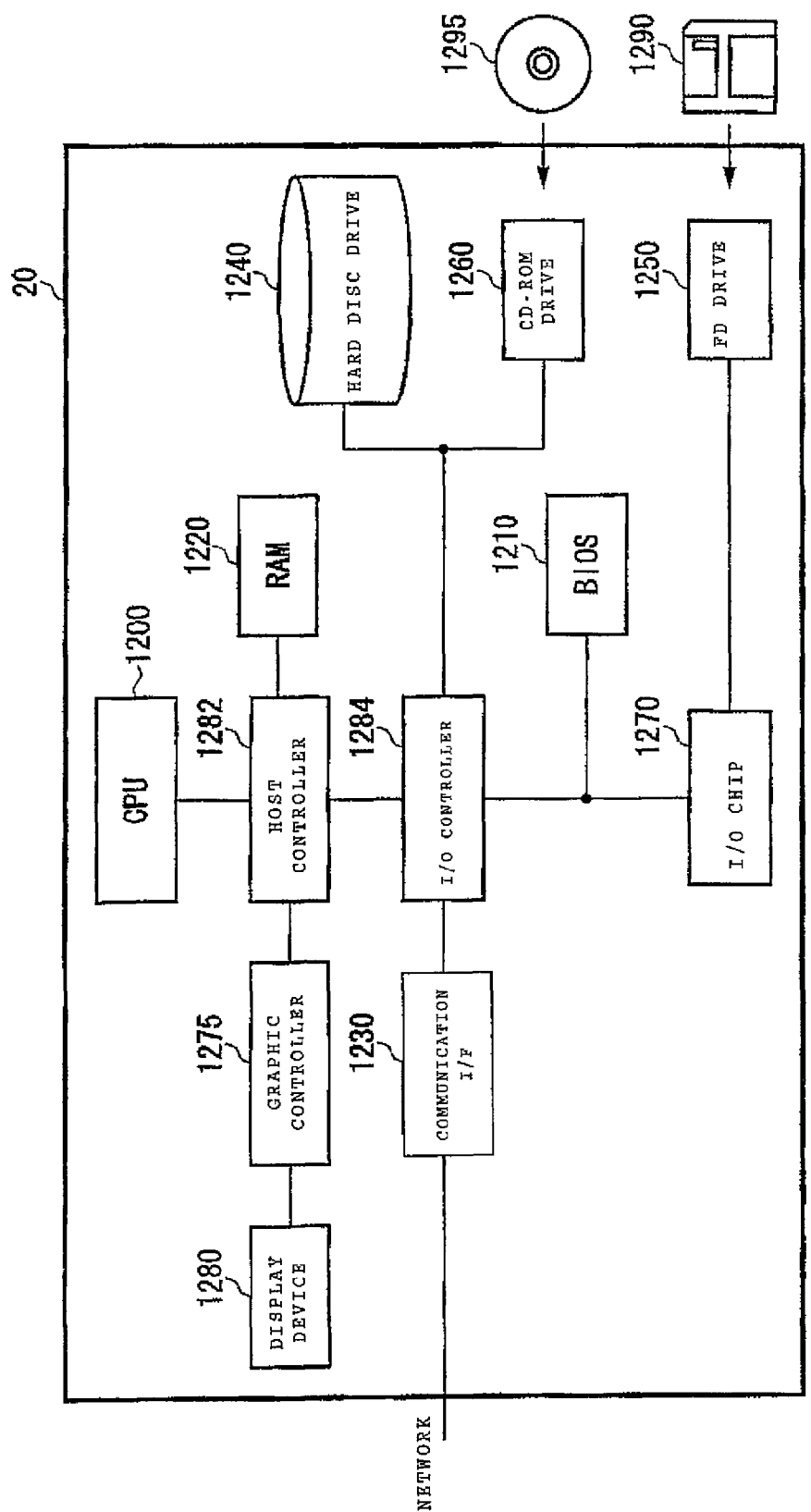
FIG. 12 is an example of the hardware arrangement of the information processing unit 20.

10 GRID COMPUTING SYSTEM
20 INFORMATION PROCESSING UNIT
30 JOB EXECUTION REQUEST GENERATION UNIT
200 SELF-INDEX VALUE STORAGE SECTION
210 OTHER-CONNECTED-INFORMATION-PROCESSING-UNIT INDEX VALUE STORAGE SECTION
220 REQUEST ACQUIRING SECTION
230 JOB HISTORY STORAGE SECTION
240 JOB EXECUTION SECTION
250 CONDITION-SATISFYING-UNIT INFORMATION STORAGE SECTION
260 CONDITION-SATISFYING-UNIT SELECTION SECTION
270 REQUEST TRANSMISSION SECTION
280 INDEX VALUE ADDITION SECTION
300 JOB EXECUTION REQUEST TRANSMISSION SECTION
310 JOB EXECUTION INSTRUCTION SECTION

The invention claimed is:

1. An information processing unit, comprising:
a computer hardware device including:
a self-index value storage section for storing a first index value indicating a processing capability of the information processing unit;
a request acquisition section for acquiring a job execution request for requesting a job to be executed from a job execution generation unit;
a job execution section for executing the job in response to a determination that the information processing unit will execute the job; wherein the determination is made on a basis of the first index value and an identification of the job to be executed;
a request transmission section for transferring the job execution request to a plurality of other information processing units connected to the information processing unit in response to a determination that the information processing unit will not execute the job,
wherein the job execution section determines that the information processing unit will execute the job in response to determining the job execution request was not received previously by comparing the identification of the job with a job history log, and
wherein the job execution section determines that the information processing unit will execute the job on condition that the first index value indicates that the information processing unit has a unit processing capability greater than a required processing capability needed for the requested job to be executed, or
the job execution section further determines that the information processing unit will execute the job on condition that the first index value indicates that the information processing unit has the unit processing capability smaller than the required processing capability needed for the requested job to be executed, and a difference between a second index value indicating the required processing capability needed for the requested job to be executed and the first index value takes on a value within a predetermined reference difference; and
an other-connected-information-processing-unit index value storage section for storing a plurality of third index values indicating other unit processing capabilities of the plurality of other information processing units connected to the information processing unit, such that each of the plurality of third index values is associated with each of the plurality of other information processing units,
wherein the request transmission section transfers the job execution request to one of the plurality of other information processing units with one of the plurality of third index values satisfying a predetermined condition,
wherein, on condition that the job is executed by the information processing unit, the self-index value storage section changes the first index value stored therein to a fourth index value showing that the unit processing capability of the information processing unit is lower than the unit processing capability indicated by the first index value; and
on condition that the job is executed by any one of the plurality of other information processing units connected to the information processing unit, the other-connected-information-processing-unit index value storage section changes one of the third index values associated with the other information processing unit that executes the job to a fifth index value showing that the unit processing capability of the other information processing unit is lower compared with the other unit processing capability indicated by the third index value.

2. The information processing unit according to claim 1, wherein, on condition that the first index value indicates a higher unit processing capability compared with the other unit processing capability indicated by the third index value, the job execution section determines that the information processing unit will execute the requested job.

3. The information processing unit according to claim 1, wherein the job execution section sets the reference difference value based on a cumulative number of transfers of the job execution request to other information processing units.

4. The information processing unit according to claim 1, wherein,
on condition that it is determined that the information processing unit will not execute the requested job, the request transmission section transfers identification information identifying the information processing unit, with the identification information thereof included in the job execution request, as history information indicative of a history of the information processing unit which transfers the job execution request; and
on condition that the identification information of the information processing unit is included in the history information being included in the job execution request, the request acquisition section returns the job execution request to an information processing unit which is a source of transfer, having transferred the job.

5. The information processing unit according to claim 1, further comprising a job history storage section for storing a history of identification information of a job execution request acquired by the request acquisition section, wherein, on condition that identification information of an acquired job execution request is included in a history stored in the job history storage section, the request acquisition section returns the job execution request to an information processing unit which is a source of transfer, having transferred the job.

6. The information processing unit according to claim 1, wherein,
on condition that it is determined that the information processing unit will not execute the requested job, the request transmission section adds one to number-of-times-of-transfers information indicating a number of times in which the job execution request has been transferred, and transmits the number-of-times-of-transfers information in the job execution request; and
the request acquisition section acquires the job execution request including the number-of-times-of-transfers information, and, on condition that the number-of-times-of-transfers information is not less than a predetermined criterion number, the request acquisition section returns the job execution request to an information processing unit which is a source of transfer, having transferred the job.

7. The information processing unit according to claim 1, wherein, on condition that the job is executed by the information processing unit, the job execution section transmits, to the other information processing units connected to the information processing unit, a notice of change for informing of a change in the first index value with the notice of change included in the job execution request; and
the self-index value storage section further stores therein in advance a plurality of third index values based on respective processing capabilities of the other information processing units connected to the information processing unit, and, on condition that the information processing unit receives the notice of change and on condition that the information processing unit has not yet received the identification information of the job thus transmitted, with the identification information included in the notice of change, the self-index value storage section changes the first index value on the basis of the notice of change, and transmits a notice of change for informing of the change in the first index value, with the notice of change including the identification information, to the other information processing units connected to the information processing unit.

8. An information processing unit, comprising:
a computer hardware device including:
a self-index value storage section for storing an index value indicating a processing capability of the information processing unit;
a request acquisition section for acquiring a job execution request for requesting a job to be executed from a job execution generation unit;
a job execution section for executing the job in response to a determination that the information processing unit will execute the job on a basis of the index value and at least one content of the job execution request, wherein the job execution request includes an identification of the job execution generation unit, an index value of a required processing capacity to execute the job, an amount of variation for the index value, a determining criterion the information processing unit must satisfy to execute the job, a time of completion requirement, and an identification of the job;
a request transmitting section for transferring the job execution request to other information processing units connected to the information processing unit in response to a determination that the information processing unit should not execute the job;
a condition-satisfying-unit information storage section for storing identification information of at least one of a plurality of other information processing units connected to the information processing unit, wherein the at least one of the plurality of other information processing units' processing capability, indicated by a plurality of indexes, satisfy a predetermined basic condition, the plurality of indexes indicating different types of processing capabilities of the at least one other information processing unit, in a way that the identification information is associated with each of the plurality of the indexes, wherein the other information processing unit's processing capability is at least one of an operation frequency of a central processing unit and memory capacity; and
a condition-satisfying-unit selection section for selecting, on a basis of a content of processing of the job being required by the job execution request, identification information corresponding to an index indicative of the type of a processing capability required for executing the job, from the condition-satisfying-unit information storage section,
wherein, on condition that it is determined that the information processing unit will not execute the requested job, the request transmission section transfers the job execution request to one of the other information processing unit or any one of other the information processing units indicated by the identification information selected by the condition-satisfying-unit selection section; and
an index value addition section for, on condition that an instruction for adding another index indicative of a processing capability of another information processing unit is given by a user, informing the other information processing units of a method of calculation for an index value of the index, and the basic condition which the index value should satisfy in order to cause the condition-satisfying-unit information storage section to store identification information,
wherein the condition-satisfying-unit information storage section calculates, for each of the other information processing units connected to the information processing unit, an index value by use of the method of calculation transmitted from the index value addition section, and stores identification information of another information processing unit or units, the calculated index value of each of which satisfies the basic condition, in a way that the identification information is associated with the index.

9. The information processing unit according to claim 8, further comprising an other-connected-information-processing-unit index value storage section for storing an index value of each of characteristics indexes indicating characteristics of a device provided in each of the other plurality of information processing units or of a software installed in each of the other plurality of information processing units, and an index value of each of load indexes indicating a processing load of the job being under processing by each of the other plurality of information processing units, as index values, each of which indicates a processing capability of each of the other plurality of information processing units, in a way that the index values are associated with each of the other plurality of information processing units connected to the information processing unit, wherein the condition-satisfying-unit information storage section stores identification information of another information processing unit or units, whose processing capabilities, indicated by the characteristics indexes, satisfy the basic condition, in a way that the identification information is associated with each of the characteristics indexes;

the condition-satisfying-unit selection section selects, on the basis of the content of processing of the requested job, identification information corresponding to a characteristics index indicative of the type of a processing capability required for executing the job, from the condition-satisfying-unit information storage section; and on condition that it is determined that the information processing unit will not execute the requested job, the request transmission section transmits the job execution request to, among the other information processing unit or units indicated by the identification information selected by the condition-satisfying-unit selection section, another information processing unit, whose index value of the load index satisfies a predetermined condition.

10. An information processing unit, comprising:

a computer hardware device including:

a condition-satisfying-unit information storage section for storing identification information of at least one of a plurality of other information processing units connected to the information processing unit, wherein the at least one of the plurality of other information processing units' processing capability, indicated by a plurality of indexes, satisfy a predetermined basic condition, the plurality of indexes indicating different types of processing capabilities of the at least one other information processing unit, in a way that the identification information is associated with each of the plurality of the indexes, wherein the other information processing unit's processing capability is at least one of an operation frequency of a central processing unit and memory capacity;

a condition-satisfying-unit selection section for selecting, on the basis of a content of processing of a job, identification information corresponding to an index indicative of the type of a processing capability required for executing the job, from the condition-satisfying-unit information storage section;

a request transmission section for transmitting a job execution request asking for execution of the job to an information processing unit which satisfies a predetermined condition among the other information processing unit or units indicated by the selected identification information; and an index value addition section for, on condition that an instruction for adding another index indicative of a processing capability of another information processing unit is given by a user, informing the other information processing units of a method of calculation for an index value of the index, and the basic condition which the index value should satisfy in order to cause the condition-satisfying-unit information storage section to store identification information, wherein the condition-satisfying-unit information storage section calculates, for each of the other information processing units connected to the information processing unit, an index value by use of the method of calculation transmitted from the index value addition section, and stores identification information of another information processing unit or units, the calculated index value of each of which satisfies the basic condition, in a way that the identification information is associated with the index.

11. A job execution request generation unit allowing any of a plurality of information processing units to execute a job in a grid computing system including the plurality of information processing units, each of the plurality of information processing units including:

a request acquisition section for acquiring a job execution request asking for execution of a job from the job execution request generation unit; and a job execution section for, in response to a determination that the information processing unit will execute the requested job, notifying the job execution request generation unit which has generated the job execution request that the job will be executed, the job execution request generation unit comprising: a computer hardware device including: a job execution request transmission section for generating the job execution request and transmitting the generated job execution request to each of a plurality of the information processing units, wherein the job execution request includes an identification of the job execution generation unit, an index value of a required processing capacity to execute the job, an amount of variation for the index value, a determining criterion the information processing unit must satisfy to execute the job, a time of completion requirement, and an identification of the job; and a job execution instruction section for, on condition that the job execution request generation unit receives, in response to the transmitted job execution request, a plurality of notices to the effect that the job will be executed, selecting an information processing unit satisfying a predetermined condition among a plurality of the information processing units which are sources of transmission of the plurality of notices, and for allowing the selected information processing unit to execute the job, wherein, on condition that the request acquisition section determines that it has already received the acquired job execution request in the past, the request acquisition section returns the acquired lob execution request to a source of transmission, from which the job execution request is transmitted; and on condition that the execution request transmission section receives back the job execution request, the job execution request transmission section transmits the job execution request to an information processing unit other than two or more of the information processing units.

* * * * *